United States Patent
Khawand et al.

(10) Patent No.: US 12,537,289 B2
(45) Date of Patent: Jan. 27, 2026

(54) THIN FILM CAPACITANCE SENSOR FOR PROXIMITY DETECTION

(71) Applicant: Microsoft Technology Licensing, LLC, Redmond, WA (US)

(72) Inventors: Charbel Khawand, Sammamish, WA (US); Andrew James Hillenius, Woodinville, WA (US); Apoorva Sharma, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 18/319,641

(22) Filed: May 18, 2023

(65) Prior Publication Data

US 2024/0387981 A1  Nov. 21, 2024

(51) Int. Cl.

| | |
|---|---|
| *H04B 1/08* | (2006.01) |
| *H01Q 1/16* | (2006.01) |
| *H01Q 1/24* | (2006.01) |
| *H01Q 1/40* | (2006.01) |
| *H01Q 1/50* | (2006.01) |
| *H04B 1/03* | (2006.01) |

(52) U.S. Cl.
CPC .............. *H01Q 1/241* (2013.01); *H01Q 1/16* (2013.01); *H01Q 1/40* (2013.01); *H01Q 1/50* (2013.01)

(58) Field of Classification Search
CPC ............ H01Q 1/241; H01Q 1/16; H01Q 1/40; H01Q 1/50; H01Q 1/245; H01Q 1/243; H04B 1/08; H04B 1/03; H04M 1/02
See application file for complete search history.

(56) References Cited

U.S. PATENT DOCUMENTS

| | | | |
|---|---|---|---|
| 5,170,175 A * | 12/1992 | Kobus | H01Q 1/36 343/895 |
| 8,432,322 B2 | 4/2013 | Amm et al. | |
| 8,952,860 B2 * | 2/2015 | Li | H01Q 1/243 343/702 |
| 8,989,792 B1 | 3/2015 | Depew | |
| 9,466,246 B1 * | 10/2016 | Jalava | G06F 1/1637 |
| 10,055,048 B2 * | 8/2018 | Smith | G06F 3/016 |
| 10,090,578 B2 * | 10/2018 | Wolentarski | H01Q 1/245 |

(Continued)

OTHER PUBLICATIONS

International Search Report and Written Opinion received for PCT Application No. PCT/US2024/025598, Sep. 10, 2024, 14 pages.

(Continued)

*Primary Examiner* — Andrew Wendell
(74) *Attorney, Agent, or Firm* — Holzer Patel Drennan (57) ABSTRACT

A system for detecting proximity of a conductive object to an antenna element is provided. The system includes a cover layer including a thin film resistive element and cover glass, an antenna layer including an antenna element, and a dielectric gap layer including an electrically insulating material. The antenna element is configured to transmit a signal. The thin film resistive element includes a material having greater conductivity than the cover glass and is configured to detectably capacitively couple with the conductive object when the conductive object is within proximity of the thin film resistive element. The dielectric gap layer is positioned between the cover layer and the antenna layer and electrically insulates the antenna element from the thin film resistive element.

20 Claims, 8 Drawing Sheets

(56) References Cited

U.S. PATENT DOCUMENTS

| | | | |
|---|---|---|---|
| 2005/0286177 A1* | 12/2005 | Gill | G11B 5/398 |
| 2008/0252536 A1* | 10/2008 | Anguera | H01Q 1/52 |
| | | | 343/702 |
| 2008/0316397 A1* | 12/2008 | Polak | H01H 13/83 |
| | | | 349/97 |
| 2012/0139115 A1* | 6/2012 | You | H01L 24/11 |
| | | | 257/751 |
| 2015/0200444 A1 | 7/2015 | Mercer et al. | |
| 2021/0027993 A1* | 1/2021 | Kim | H01J 37/32119 |
| 2021/0184371 A1* | 6/2021 | Ying | H01Q 3/247 |
| 2022/0261048 A1* | 8/2022 | Park | G06F 1/1626 |
| 2023/0195266 A1* | 6/2023 | Kadowaki | G06F 3/0446 |
| | | | 345/179 |

OTHER PUBLICATIONS

International Preliminary Report On Patentability received for PCT Application No. PCT/US2024/025598, mailed on Nov. 27, 2025, 09 pages.

* cited by examiner

THIN FILM CAPACITANCE SENSOR FOR PROXIMITY DETECTION

BACKGROUND

Devices transmit wireless radiofrequency (RF) signals as energy from antennas. The energy can be absorbed by nearby objects, including humans using the devices. Government regulations include specific absorption rate (SAR) limits on the transmission energy of the RF signals when a human is proximal to the antennas to mitigate possible damage to human tissue by the transmitted energy. Communication systems can limit power supplied to antennas when human anatomical features are determined to be proximal to the antennas to satisfy the SAR regulations.

SUMMARY

The presently disclosed technology provides a system for detecting the proximity of a conductive object to an antenna element is provided. The system includes a cover layer including a thin film resistive element and cover glass, an antenna layer including an antenna element, and a dielectric gap layer including an electrically insulating material. The antenna element is configured to transmit a signal. The thin film resistive element includes a material having greater conductivity than the cover glass and is configured to detectably capacitively couple with the conductive object when the conductive object is within proximity of the thin film resistive element. The dielectric gap layer is positioned between the cover layer and the antenna layer and electrically insulates the antenna element from the thin film resistive element.

This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTION

Communication devices can include SARs controllers that reduce transmission power supplied to an antenna in response to detecting that a body part is close to the antenna. This reduction in power reduces the strength of a radio frequency (RF) signal transmitted from the antenna, which reduces the effectiveness of the communication. The ability to distinguish between body parts (e.g., human or animal anatomical features) and inanimate objects can reduce the amount of time the antennas unnecessarily transmit with low transmission power. However, including existing sensor systems for detecting the proximity of a body part to an antenna adds undesired bulk (e.g., thickness) and manufacturing complexity to communication devices. Further, existing sensor systems for detecting body parts are sensitive to environmental conditions and degrade over time with exposure to differing levels of humidity and temperature. When existing proximity sensor systems fail, communication devices consistently limit the transmission power, even at times when no body part is proximal to the antenna.

The presently disclosed technology detects the proximity of a conductive object to an antenna element using a thin film resistive element in combination with a cover glass layer. Including the thin film resistive element with a cover glass layer limits added thickness to the device. Also, the thin film resistive element can be degraded over time by exposure to certain environmental conditions. Accordingly, positioning the thin film resistive element within or on an interior surface of the cover glass layer limits exposure of the thin film resistive element to the environmental conditions and, therefore, eliminates or limits such degradation. In an implementation, the thin film resistive element is spaced from an antenna element in an antenna layer by a dielectric gap layer at least partially composed of an electric insulator, which insulates the thin film resistive element from the antenna element to prevent coupling between capacitive sensing signals and antenna transmission RF signals.

In implementations, the thin film resistive element is positioned to mitigate interference the thin film resistive element can cause to RF signals transmitted from an antenna element. In one implementation, the thin film resistive element is positioned so as to not obstruct the RF signal transmitted. In another implementation, the thin film resistive element is designed with gaps or apertures through which a signal transmitted from an antenna element can transmit.

Figure 1:
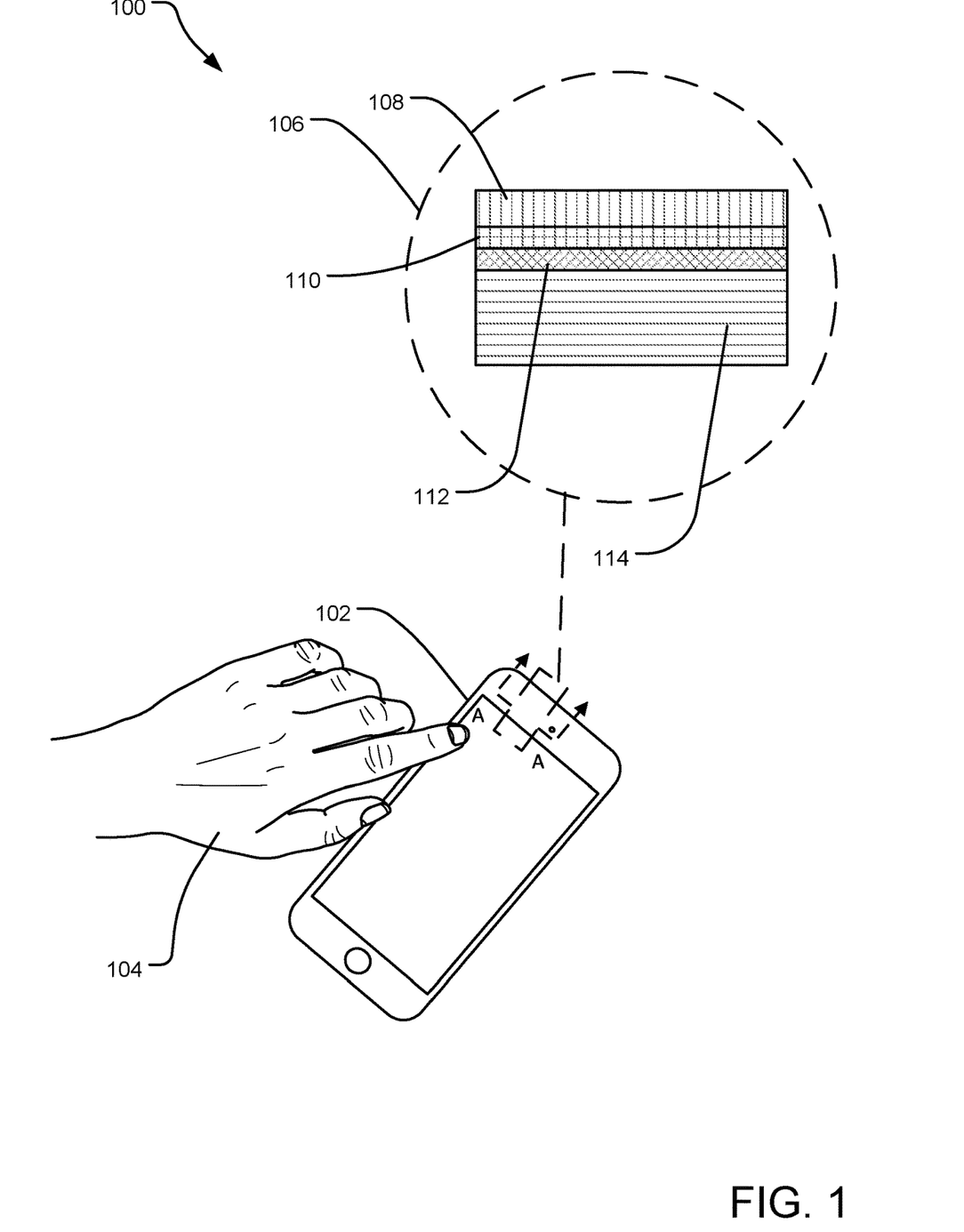
FIG. 1 illustrates an example system for detecting the proximity of a conductive object to an antenna element.

FIG. 1 illustrates an example system 100 for detecting the proximity of a conductive object to an antenna element 114. A device 102 includes the antenna element 114 in an antenna layer. The antenna element 114 is configured to transmit RF signals from the device 102. A cross-sectional perspective 106 shows a cross-section of the device 102. A dielectric gap layer 112 is positioned between the antenna element 114 and a cover layer 108. The cover layer 108 includes a glass material as part of a cover glass, such as for a display. The cover layer also includes a thin film resistive element 110, which is a conductive element that is more conductive than the glass material of the cover glass in the cover layer 108. The cover glass is a solid and radiofrequency (RF) transparent material (e.g., a silicon dioxide glass, a polymer, or another material) through which the antenna element 114 transmits signals. The antenna element 114 is positioned close to the thin film resistive element 110 so that the proximity of a conductive object to the thin film resistive element 110 is effectively the same as or at least very similar to the proximity of the conductive object to the antenna element 114.

The dielectric gap layer 112 separates and electrically isolates the antenna layer and antenna element 114 from the cover layer 108 and the thin film resistive element 110. In an implementation, the dielectric gap layer 112 includes an adhesive (e.g., a pressure-sensitive adhesive) used to couple the cover layer 108 to the antenna layer. The adhesive can be applied to maintain a predefined distance between the cover layer 108 and the antenna layer. In an implementation, the dielectric gap layer 112 additionally or alternatively includes air or another insulating fluid. In this implementation, the dielectric gap layer 112 can include a spacer to maintain a space of a predefined volume to contain the insulating fluid between the cover layer 108 and the antenna layer.

When a hand 104 of a user of the device 102 is away from the device 102, the device 102 supplies the antenna element 114 with high transmission power to generate a strong RF transmission signal. However, when the hand 104 approaches the antenna element 114, the device 102 is required by regulations to reduce the transmission power to satisfy specific absorption rate (SAR) limits. The reduction in transmission power reduces the strength of the RF signal and can reduce the communication performance of the device 102. The device 102 uses the thin film resistive element 110 to detect the proximity of the hand 104 to the antenna element 114. In turn, the device 102 can determine whether the hand 104 is in sufficiently close proximity that SAR regulations require that the device 102 modify (e.g., reduce) transmission power supplied to the antenna element 114 for transmitting the RF signal. Proximity detection facilitated by the thin film resistive element 110 provides a tool to limit the durations during which transmission power is lower-if no object is detected in the proximity, the transmission power can be restored or increased.

The cover layer 108 includes the thin film resistive element 110. In an implementation, the thin film resistive element 110 is positioned on an interior surface of cover glass of the cover layer 108. One example method by which the thin film resistive element 110 is positioned with respect to a surface of the cover layer 108 includes thin film deposition (e.g., by magnetron sputtering or other vapor deposition method) of the thin film resistive element 110 onto the interior surface of the cover glass of the cover layer 108. In another example, the shape of the thin film resistive element 110 is etched into the cover glass of the cover layer 108 and subsequently filled with conductive material. In yet another example, the thin film resistive element 110 is printed with a dye onto the cover glass of the cover layer 108. Other techniques may be employed.

In other implementations, the thin film resistive element 110 is contained or embedded within the cover glass in the cover layer 108. Examples of methods by which the thin film resistive element 110 is deposited within the cover glass may include, without limitation, performing ion implantation of conductive ions at a predefined depth within the cover glass, exposing the cover glass of the cover layer 108 to UV or other electromagnetic radiation to ionize the cover glass at a predefined depth, or depositing the thin film resistive element 110 between at least two layers of cover glass within the cover layer 108. In an implementation, the thin film resistive element 110 is positioned on a surface or side of the cover layer 108 that faces or is in closest proximity to the antenna layer (e.g., an interior surface of the cover glass).

In implementations, the thin film resistive element 110 is continuous or, alternatively, includes gaps or apertures. In an implementation, the thin film resistive element 110 is positioned to overlap the antenna element 114 in an axis extending substantially orthogonally through a surface (e.g., a layer interface) of one or more of the cover layer 108, the antenna layer, or the dielectric gap layer 112. In an implementation, the thin film resistive element 110 is positioned such that the antenna element 114 is exposed (e.g., the thin film resistive element 110 does not overlap the antenna element 114) in an axis extending substantially orthogonally through a surface (e.g., a layer interface) of one or more of the cover layer 108, the antenna layer, or the dielectric gap layer 112. In implementations in which the thin film resistive element 110 includes gaps or apertures, the thin film resistive element 110 can be positioned to overlap the antenna element 114 but enable transmission of RF signals from the antenna element through the gaps or apertures.

In an implementation, the device 102 includes proximity detection circuitry (not shown in FIG. 1) communicatively coupled to the antenna element 114. The thin film resistive element 110 includes (e.g., is electrically coupled to) an electrode element positioned on or through a surface of the cover layer 108 by which the thin film resistive element 110 electronically communicates with the proximity detection circuitry and/or a SAR controller. The proximity detection circuitry transmits values of the supplied current and/or the capacitive coupling to a specific absorption rate (SAR) controller.

The proximity detection circuitry detects the proximity of a conductive object, such as the hand 104, to the antenna element 114. In an implementation, the proximity detection circuitry supplies a predefined current to the antenna element 114. In implementations, the current is a low-frequency, low-amplitude alternating current. In this implementation, the antenna element 114 and the conductive object function as terminals of a capacitor separated by an insulator, which, in the illustrated example, is air. Changes in capacitance measurable from the thin film resistive element 110 in response to the applied current and the proximity of the conductive object are interpretable as measures of proximity. The proximity detection circuitry measures the capacitive coupling between the conductive object and the antenna element 114 and interprets the capacitance values of the capacitive coupling to detect the proximity of the conductive object to the thin film resistive element 110.

In an implementation, the SAR controller determines whether to modify transmission power to the antenna element 114 for transmitting an RF signal based on a determined proximity and/or an identification of a conductive object. The SAR controller determines the proximity of the conductive object and/or identifies the conductive object. The SAR controller uses body detection parameters determined by the SAR controller or the proximity detection circuitry for the determination and/or identification. Examples of body detection parameters include the capacitive coupling (e.g., capacitance) between the conductive object and the thin film resistive element 110, the supplied current to the thin film resistive element 110, a dielectric loss of the hand 104 determined therefrom, or a combination thereof.

In implementations, the SAR controller determines the proximity of the conductive object to the thin film resistive element 110 (and, hence, the antenna element 114). When the conductive object approaches the thin film resistive element 110 in satisfaction of a proximity condition, the SAR controller determines the conductive object is in the proximity of the antenna element 114. Examples of the proximity condition include a predefined distance threshold or a predefined distance range.

In implementations, the SAR controller determines that the hand 104 is a body part in satisfaction of a body detection condition based on body detection parameters. Examples of body detection conditions include a predefined threshold value of a body detection parameter(s), a predefined range of the body detection parameter(s) values, or predefined SAR profiles in a data structure associating values of body detection parameter(s) with specific types of objects (e.g., body parts or inanimate objects). The body detection condition can be further based on other inferential methods for distinguishing between proximal body parts and proximal inanimate objects.

Based on the determined proximity and/or the identification of the conductive object to the thin film resistive element 110, the SAR controller determines whether a SAR condition is satisfied. Examples of the SAR condition include an identification of whether the conductive object is a body part (e.g., in satisfaction of a body detection condition) and whether the conductive object is sufficiently close to the thin film resistive element 110 (e.g., in satisfaction of a proximity condition). When the SAR condition is satisfied, the SAR controller instructs the device 102 to modify (e.g., reduce) transmission power supplied to the antenna element. When the SAR condition is unsatisfied (e.g., if the hand 104 never approaches or is distanced from the thin film resistive element 110), the device 102 can continue to provide full transmission power to the antenna element 114 for transmitting the RF signal.

Although described as separate determinations, implementations are contemplated in which the satisfaction of the SAR condition is directly determined based on the values of the body detection parameter(s) without separately determining the proximity and/or identifying the conductive object and/or without determining the satisfaction of a proximity condition or a body detection condition. In the illustrated implementation, when the hand 104 approaches the thin film resistive element 110 to satisfy a proximity condition and/or the SAR controller determines that the hand 104 is a body part, the SAR controller backs off the transmission power supplied to the antenna element 114 to mitigate any harm the electromagnetic radiation of the RF signal transmitted by the antenna element 114 would have caused to the hand 104 at full transmission strength.

In an implementation, the proximity detection circuitry is an element of a touch controller of a capacitive touch sensor display. In this implementation, the touch controller is configured to detect touch signals from a touch sensor other than the thin film resistive element 110. In implementations, the touch sensor is positioned in the device 102 at a position other than on a surface of or within the cover layer 108.

Implementations are contemplated in which the proximity detection circuitry and the SAR controller are one integrated element. The SAR controller can be implemented in hardware (e.g., as a dedicated hardware element or ASIC), by general-purpose processing hardware with memory using software, or by a combination thereof. Similarly, although identified herein as "circuitry," the proximity detection circuitry can be implemented by dedicated hardware, by general-purpose processing hardware with memory using software (e.g., a proximity detection application), or a combination thereof.

In an implementation, the device 102 further includes a second antenna element and a second thin film resistive element adjacent to the second antenna element positioned in a portion of the device 102 different or distant from the thin film resistive element 110 and the antenna element 114 (e.g., positioned sufficiently far apart that interaction between their respective transmission fields will not affect the satisfaction of a SAR condition by either). In this implementation, the SAR controller can instruct the system 100 to provide more transmission power to the second antenna element to transmit a signal than the antenna element 114 when the thin film resistive element 110 detects an object is proximal to the antenna element 114 and the second thing film resistive element does not.

Figure 2:
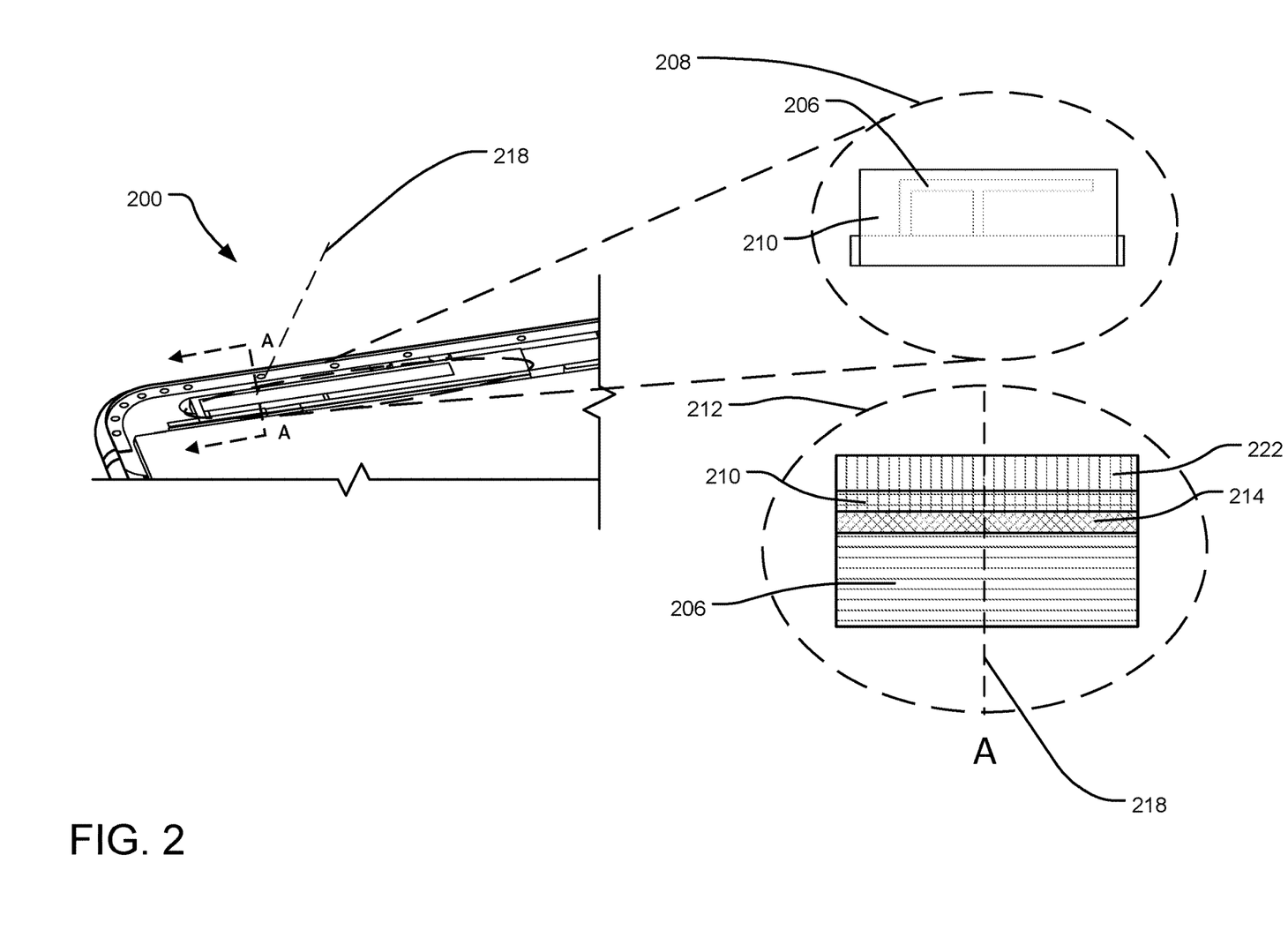
FIG. 2 illustrates an example device in which a thin film resistive element covers an antenna element.
Figure 3:
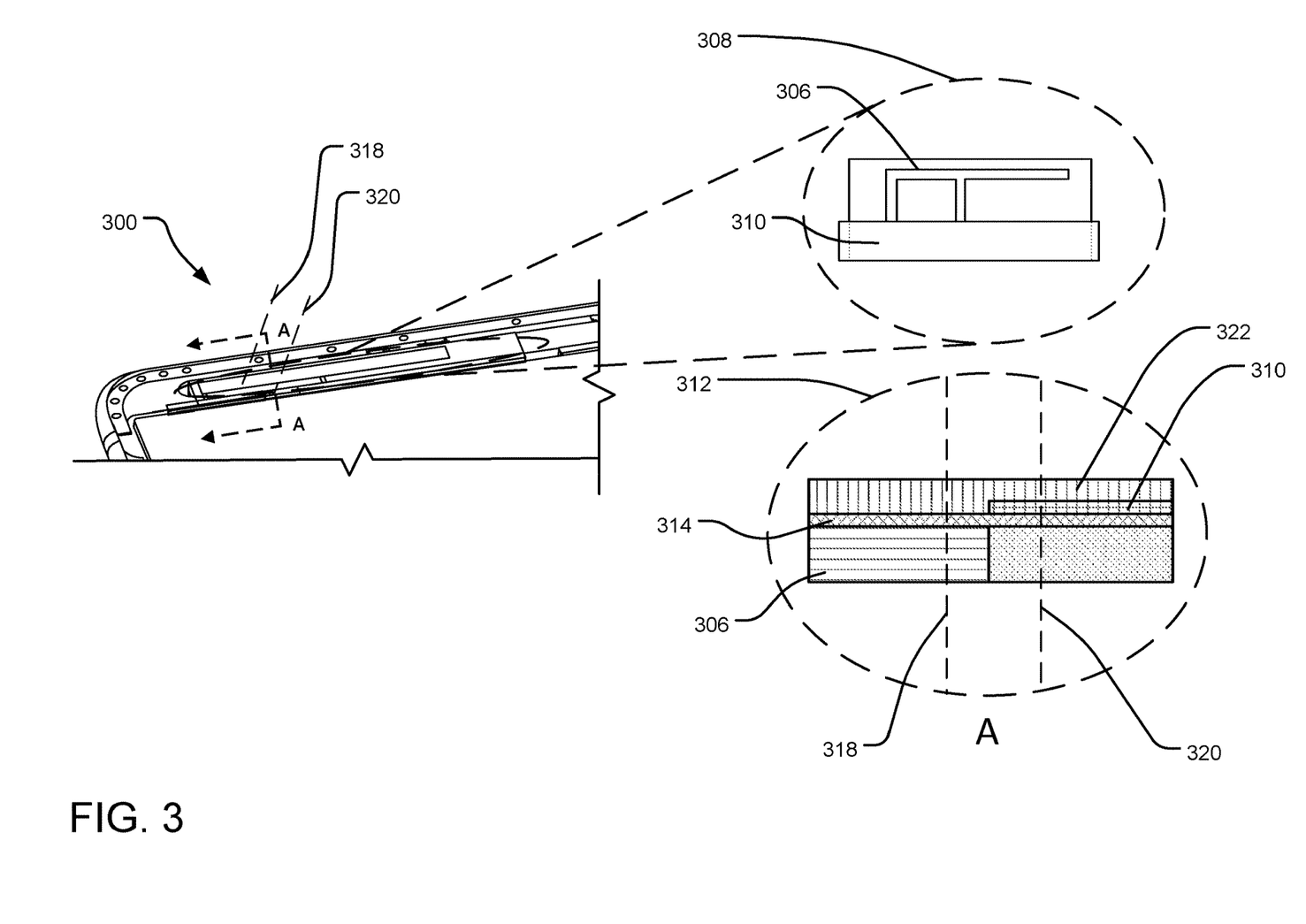
FIG. 3 illustrates an example device in which a thin film resistive element does not cover an antenna element.

FIGS. 2 and 3 illustrate positional configurations of an antenna element relative to a continuous thin film resistive element. Specifically, FIG. 2 illustrates an example device 200 in which a thin film resistive element 210 covers an antenna element 206. The device 200 includes the antenna element 206 in an antenna layer separated and electrically insulated by a dielectric gap layer 214 from the thin film resistive element 210 of a cover layer 222. A first perspective 208 illustrates a focused top field view of the device 200 showing the thin film resistive element 210 covering the antenna element 206. A second perspective 212 illustrates a focused cross-sectional view of the device 200. In the illustrated implementation, the thin film resistive element 210 overlaps the antenna element 206 in an axis 218 orthogonal to a surface (e.g., a major surface or interface between layers) of one or more of the cover layer 222, the antenna layer, or the dielectric gap layer 214.

FIG. 3 illustrates an example device 300 in which a thin film resistive element 310 does not cover an antenna element 306. Covering the antenna element 306 with the thin film resistive element 310 can cause interference in an RF signal transmitted from the antenna element 306. Positioning the thin film resistive element to not cover the antenna element 306 can improve the RF signal strength. The device 300 includes an antenna layer with the antenna element 306 separated and electrically insulated by a dielectric gap layer 314 from the thin film resistive element 310 of a cover layer 322. A first perspective 308 illustrates a focused top field view of the device 300 showing the thin film resistive element 310 covering the antenna element 306. A second perspective 312 illustrates a focused cross-sectional view of the device 300. In the illustrated implementation, the thin film resistive element 310 does not overlap the antenna element 306 in a first axis 318 or a second axis 320 orthogonal to a surface (e.g., a major surface or interface between layers) of one or more of the cover layer 322, the antenna layer, or the dielectric gap layer 314.

Figure 4:
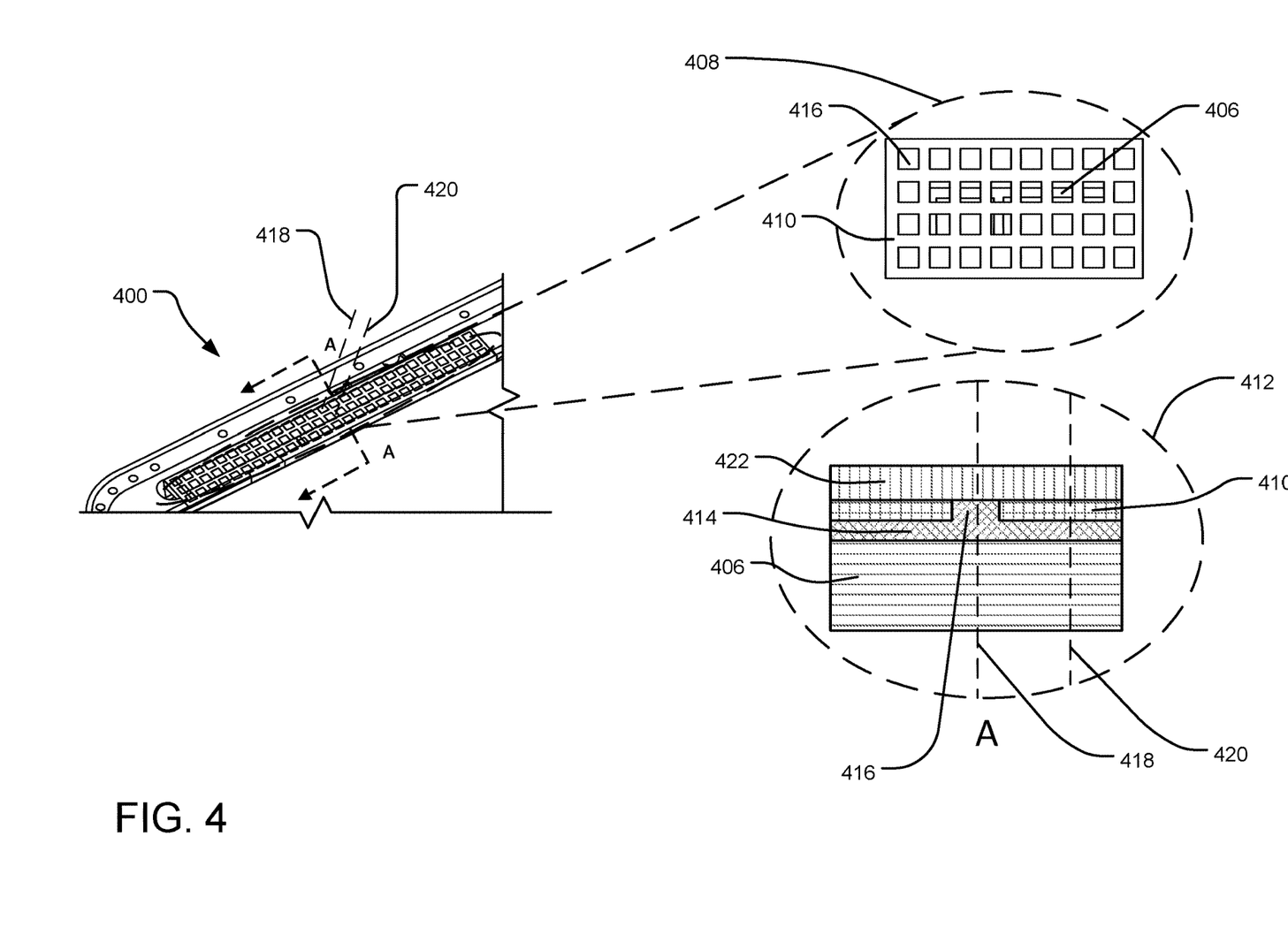
FIG. 4 illustrates an example device, including a thin film resistive element with rectangular gaps.
Figure 5:
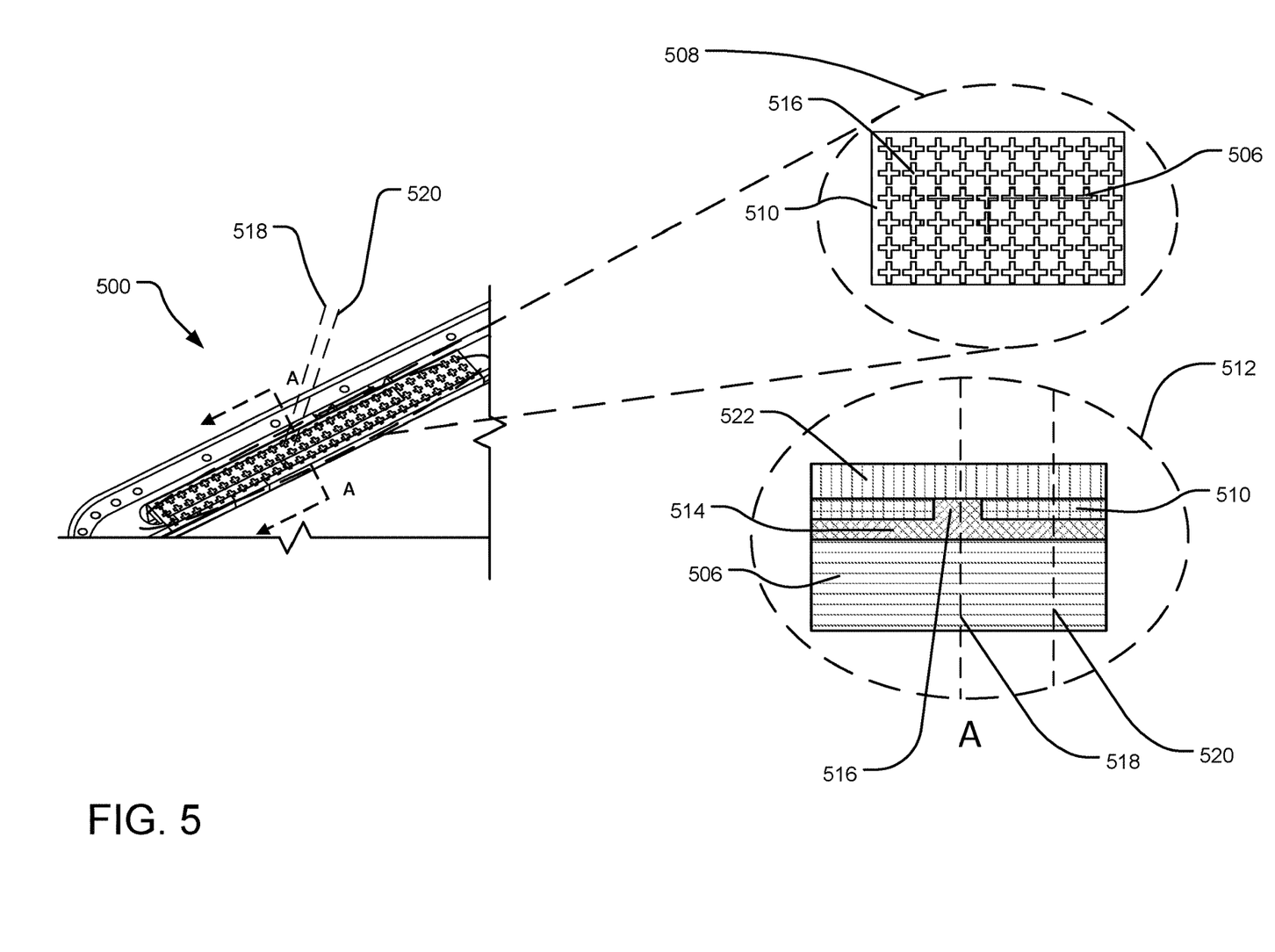
FIG. 5 illustrates an example device, including a thin film resistive element with cruciform gaps.

FIGS. 4 and 5 illustrate configurations of the devices in which a thin film resistive element includes gaps. By including gaps or apertures, even if the thin film resistive element covers an antenna element, the antenna element can transmit RF signals through the gaps. Including gaps in the thin film resistive element can improve signal performance relative to a configuration in which the thin film resistive element is continuous and covers the antenna element.

Specifically, FIG. 4 illustrates an example device 400, including a thin film resistive element 410 with rectangular gaps 416. The rectangular gaps 416 are square or otherwise rectangularly shaped. The device 400 includes an antenna layer with an antenna element 406 separated and electrically insulated by a dielectric gap layer 414 from the thin film resistive element 410 of a cover layer 422. A first perspective 408 illustrates a focused top field view of the device 400 showing the thin film resistive element 410 covering the antenna element 406 but including the rectangular gaps 416. A second perspective 412 illustrates a focused cross-sectional view of the device 400. In the illustrated implementation, the thin film resistive element 410 overlaps the antenna element 406 in a first axis 420 extending substantially orthogonally through a surface (e.g., a major surface or interface between layers) of the cover layer 422, the antenna layer, and/or the dielectric gap layer 414. The thin film resistive element 410 includes rectangular gaps 416 such that the thin film resistive element 410 and the antenna element 406 do not overlap in a second axis 418 extending through the rectangular gaps 416 and substantially orthogonally through a surface (e.g., a major surface or interface between layers) of the cover layer 422, the antenna layer, and/or the dielectric gap layer 414.

FIG. 5 illustrates an example device 500, including a thin film resistive element 510 with cruciform gaps 516. The device 500 includes an antenna layer with an antenna element 506 separated and electrically insulated by a dielectric gap layer 514 from the thin film resistive element 510 of a cover layer 522. A first perspective 508 illustrates a focused top field view of the device 500 showing the thin film resistive element 510 covering the antenna element 506 but including the cruciform gaps 516. A second perspective 512 illustrates a focused cross-sectional view of the device 500. In the illustrated implementation, the thin film resistive element 510 overlaps the antenna element 506 in a first axis 520 extending substantially orthogonally through a surface (e.g., a major surface or interface between layers) of the cover layer 522, the antenna layer, and/or the dielectric gap layer 514. The thin film resistive element 510 includes cruciform gaps 516 such that the thin film resistive element 510 and the antenna element 506 do not overlap in a second axis 518 extending through the cruciform gaps 516 and substantially orthogonally through a surface (e.g., a major surface or interface between layers) of the cover layer 522, the antenna layer, and/or the dielectric gap layer 514.

Figure 6:
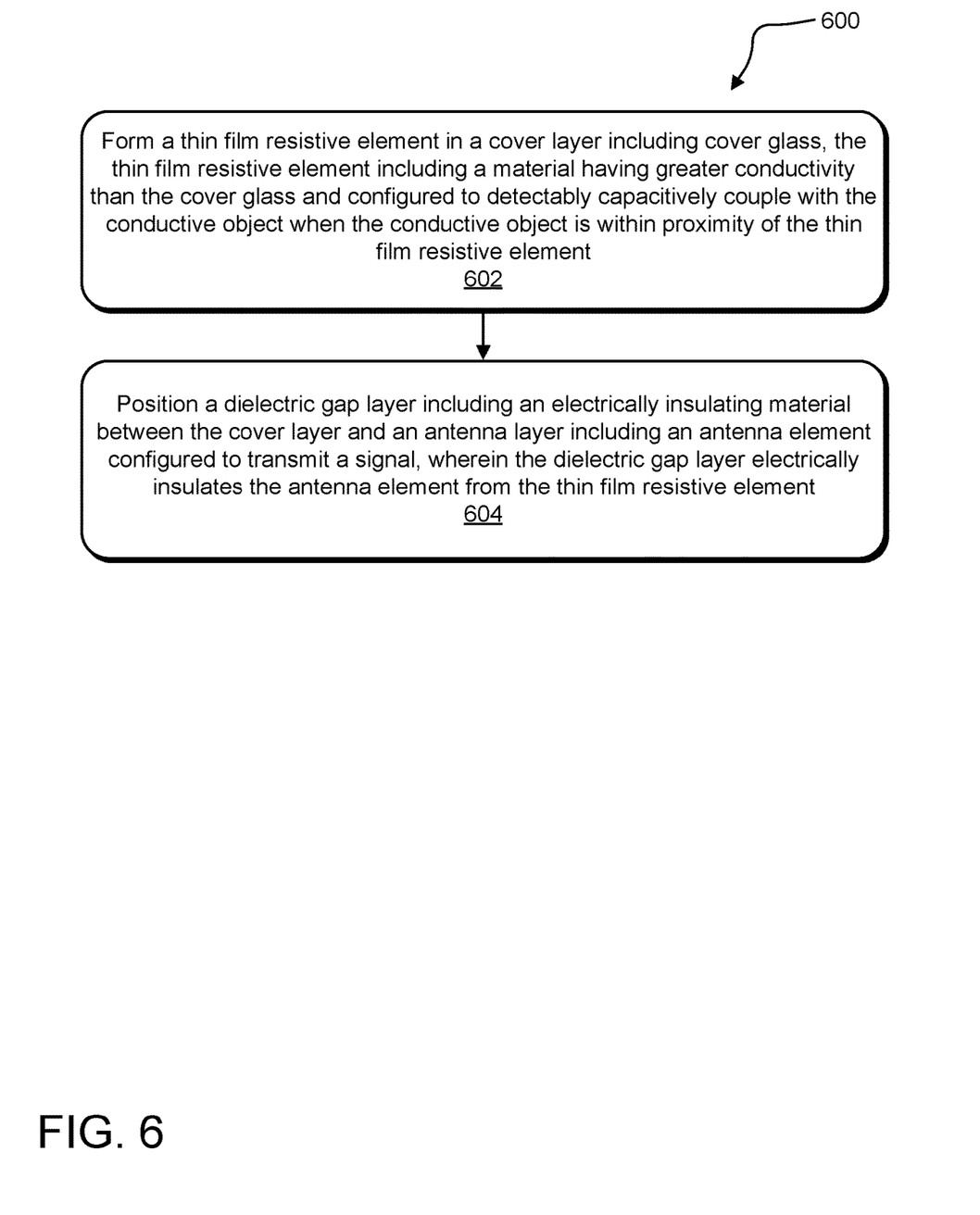
FIG. 6 illustrates example operations for manufacturing a device configured to detect the proximity of a conductive object to an antenna element.

FIG. 6 illustrates example operations 600 for manufacturing a device configured to detect the proximity of a conductive object to an antenna element. A forming operation 602 forms the thin film resistive element in a cover layer, including cover glass. The thin film resistive element includes a material having greater conductivity than the cover glass. The thin film resistive element is configured to detectably capacitively couple with the conductive object when the object is within proximity of the thin film resistive element.

In an implementation, the forming operation 602 forms the thin film resistive element on a surface of cover glass of the cover layer. Examples of methods by which the thin film resistive element is formed with respect to a surface of the cover layer include that the thin film resistive element is deposited (e.g., by magnetron sputtering or other vapor deposition method) onto the cover glass of the cover layer, the shape of the thin film resistive element is etched into the cover glass of the cover layer and subsequently filled with conductive material, or the thin film resistive element is printed with a dye onto the cover glass of the cover layer. In an implementation, the thin film resistive element is positioned to be contained within the cover glass in the cover layer. Examples of methods by which the thin film resistive element is formed within the cover glass include exposing the cover glass of the cover layer to UV or other electromagnetic radiation to ionize the cover glass at a predefined depth within the cover layer or using one or more of the examples of positioning the thin film resistive element with respect to the cover glass of the cover layer with a subsequent layering of further cover glass over the thin film resistive element.

A positioning operation 604 positions a dielectric gap layer, including an electrically insulating material, between the cover layer and an antenna layer, including the antenna element. The antenna element is configured to transmit an RF signal. The dielectric gap layer electrically insulates the antenna element from the thin film resistive element.

The positioning operation 604 separates and electrically insulates the antenna layer and antenna element from the cover layer and the thin film resistive element by the dielectric gap layer. In an implementation, positioning operation 604 introduces an adhesive (e.g., a pressure-sensitive adhesive) as the dielectric gap layer used to couple the cover layer to the antenna layer. The positioning operation 604 can apply the adhesive to maintain a predefined distance between the cover layer and the antenna layer. In an implementation, the positioning operation 604 additionally or alternatively includes introducing air or another insulating fluid to function as a dielectric gap layer. In this implementation, the positioning operation 604 positions a spacer as an element of the dielectric gap layer to maintain a space of a predefined size to contain the insulating fluid between the cover layer and the antenna layer.

In implementations, the operations 600 can further include a coupling operation (not illustrated) that electrically couples the thin film resistive element with proximity detection circuitry and/or a SAR controller. The proximity circuitry is configured to detect the proximity of the conductive object to the antenna element by passing an alternating current through the thin film resistive element and detecting the capacitive coupling between the thin film resistive element and the conductive object. The proximity circuitry determines values of body detection parameters and determines the proximity based on the values. The SAR controller is configured to determine whether to modify transmission power supplied to the antenna element based on whether the conductive object is proximal and/or based on identifying whether the conductive object is a body part or an inanimate object, as described herein.

Figure 7:
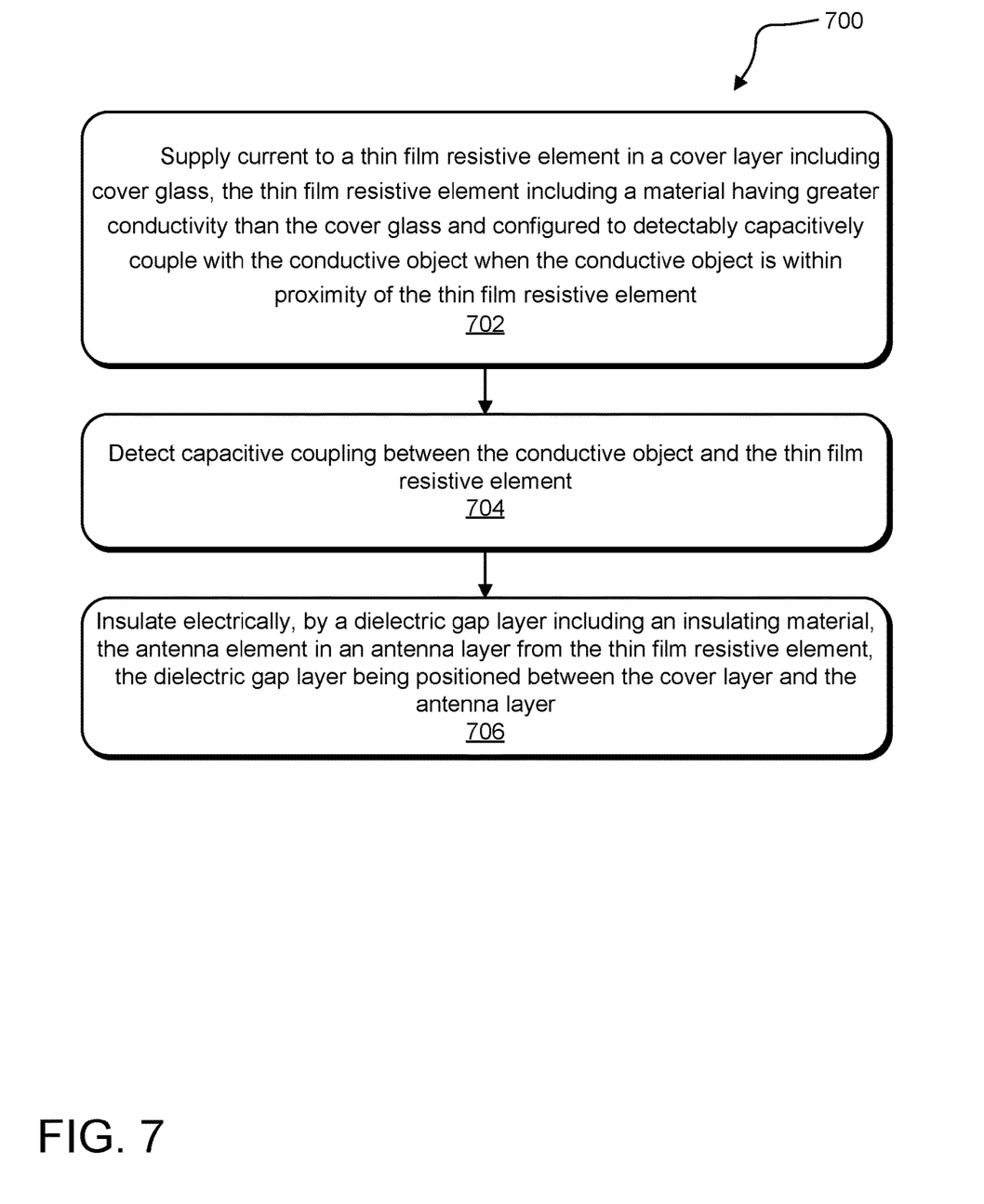
FIG. 7 illustrates example operations 700 for detecting the proximity of a conductive object to an antenna element in a device.

FIG. 7 illustrates example operations 700 for detecting the proximity of a conductive object to an antenna element in a device. A supplying operation 702 supplies current to a thin film resistive element in a cover layer, including cover glass. The thin film resistive element includes a material having greater conductivity than the cover glass and is configured to detectably capacitively couple with the conductive object when the conductive object is within proximity of the thin film resistive element.

A detecting operation 704 detects capacitive coupling (e.g., a capacitance) between the conductive object and the thin film resistive element. The detecting operation 704 uses proximity detection circuitry to detect the capacitive coupling, as described herein. An insulating operation 706 electrically insulates, by a dielectric gap layer including an insulating material, the antenna element in an antenna layer from the thin film resistive element. The dielectric gap layer is positioned between the cover layer and the antenna layer.

In an implementation, the operations 700 further include a determining operation (not illustrated) that determines whether transmission power should be modified based on the detecting operation 704. For example, the determining operation can use the proximity detection circuitry or a SAR controller to determine values of body detection parameters as described herein. The determining operation can then use the SAR controller and/or the proximity detection circuitry to determine, based on the values of the body detection parameters, whether the conductive object is proximal in satisfaction of a proximity condition, whether the conductive object is a body part in satisfaction of a body detection condition, and/or whether the satisfaction of the proximity condition, the satisfaction of the body detection condition, other inferential factors for detecting a body, and/or the values of the body detection parameters, satisfy a SAR condition, as described herein.

In an implementation, the operations 700 further include a modifying operation (not illustrated) that modifies transmission power supplied to the antenna element to transmit an RF signal based on the detection of the capacitive coupling. In an implementation, the modifying operation uses the SAR controller to instruct the device to modify the transmission power of the antenna element (e.g., responsive to the determining operation determining the SAR condition is satisfied). For example, if the SAR controller determines that a hand of a user is sufficiently proximal to the antenna element, the SAR controller will back off the transmission supplied to the antenna element for the transmission of an RF signal. This can mitigate any damage the energy from the signal will cause to the hand in proximity to the antenna element.

Figure 8:
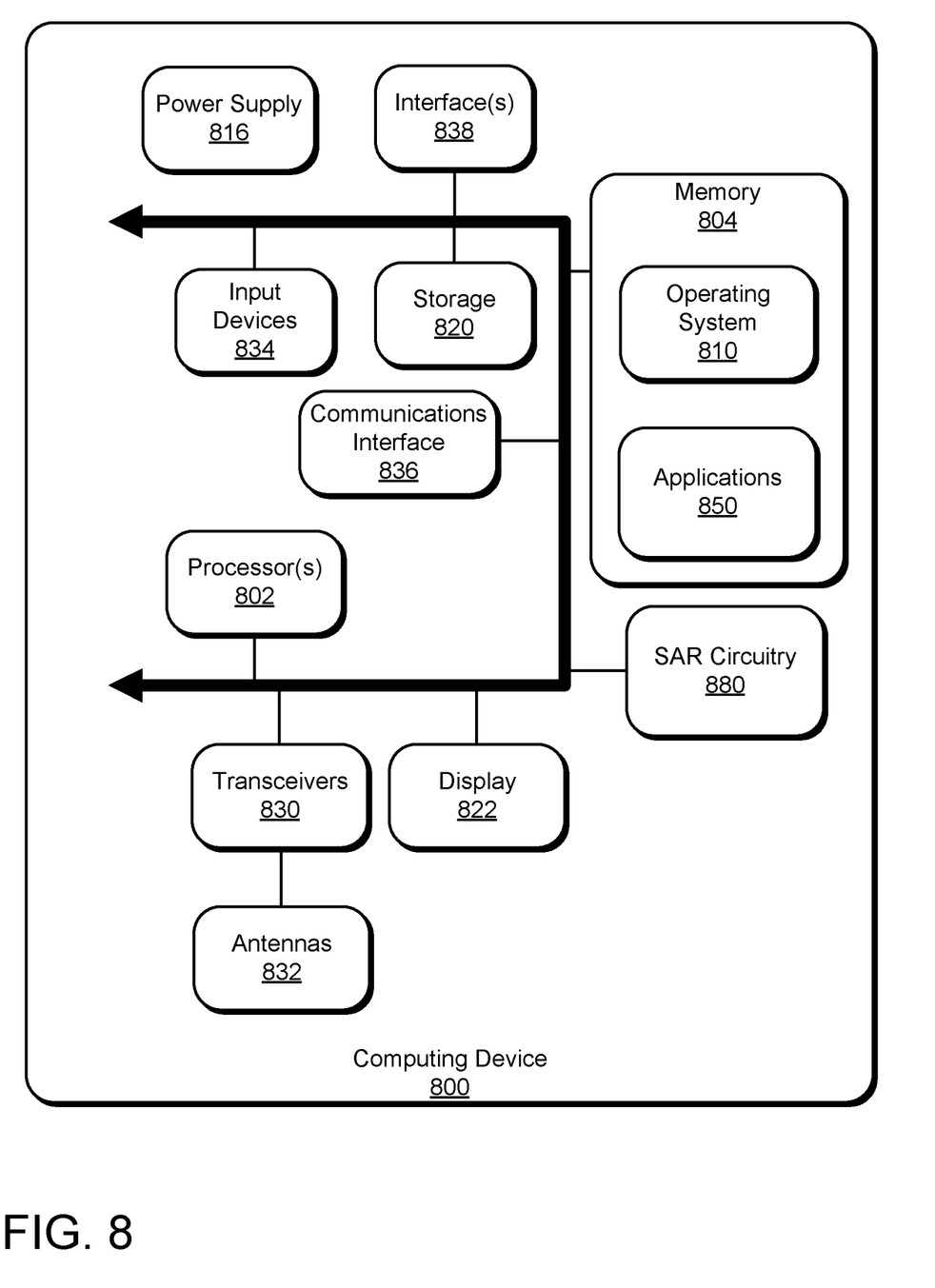
FIG. 8 illustrates an example computing device for use in implementing the described technology.

FIG. 8 illustrates an example computing device 800 for use in implementing the described technology. The computing device 800 may be a client computing device (such as a laptop computer, a desktop computer, or a tablet computer), a server/cloud computing device, an Internet-of-Things (IOT), any other type of computing device, or a combination of these options. The computing device 800 includes one or more processor(s) 802 and a memory 804. The memory 804 generally includes both volatile memory (e.g., RAM) and nonvolatile memory (e.g., flash memory), although one or the other type of memory may be omitted. An operating system 810 resides in the memory 804 and is executed by the processor(s) 802. In some implementations, the computing device 800 includes and/or is communicatively coupled to storage 820.

In the example computing device 800, as shown in FIG. 8, one or more modules or segments, such as applications 850, a SAR controller, a proximity detector application (e.g., a software element that replaces or supplements the disclosed operation of the proximity detection circuitry), and other program code and modules are loaded into the operating system 810 on the memory 804 and/or the storage 820 and executed by the processor(s) 802. The storage 820 may store a body detection parameter, a value of a body detection parameter, a SAR condition, a proximity condition, a body detection condition, a data structure referenceable to retrieve a SAR profile, SAR motion data, a capacitance, a capacitive coupling, a dielectric loss, a detected proximity distance, and other data and be local to the computing device 800 or may be remote and communicatively connected to the computing device 800. In particular, in one implementation, components of a SAR controller or proximity detection circuitry (or a corresponding proximity detection application) may be implemented entirely in hardware or in a combination of hardware circuitry and software.

The computing device 800 includes a power supply 816, which may include or be connected to one or more batteries or other power sources, and which provides power to other components of the computing device 800. The power supply 816 may also be connected to an external power source that overrides or recharges the built-in batteries or other power sources.

The computing device 800 may include one or more communication transceivers 830, which may be connected to one or more antenna(s) 832 (e.g., including the antenna element as described herein) to provide network connectivity (e.g., mobile phone network, Wi-Fi®, Bluetooth®) to one or more other servers, client devices, IoT devices, and other computing and communications devices. The computing device 800 may further include a communications interface 836 (such as a network adapter or an I/O port, which are types of communication devices). The computing device 800 may use the adapter and any other types of communication devices for establishing connections over a wide-area network (WAN) or local-area network (LAN). It should be appreciated that the network connections shown are exemplary and that other communications devices and means for establishing a communications link between the computing device 800 and other devices may be used.

The computing device 800 may include one or more input devices 834 such that a user may enter commands and information (e.g., a keyboard, trackpad, or mouse). These and other input devices may be coupled to the server by one or more interfaces 838, such as a serial port interface, parallel port, or universal serial bus (USB). Other interfaces may include a sensor or an actuator. The actuator may be configured to move responsive to the sensors (e.g., in a feedback loop) and may be used to execute any operations described herein. The computing device 800 may further include a display 822, such as a touchscreen display.

In an implementation, the computing device 800 may include SAR circuitry 880. The SAR circuitry 880 is a hardware element configured to perform operations of the SAR controller and/or the proximity detection circuitry. It should be appreciated that implementations of the computing device 800 are contemplated in which the SAR controller and/or the proximity detection circuitry are implemented entirely or partially in software executed by the processor(s) 802 (such that the SAR circuitry 880 can be omitted) or are implemented by a combination of software and dedicated hardware of the SAR circuitry 880. Implementations are also contemplated in which all or a part of the proximity detection circuitry is implemented as an element of a touch sensor of the display 822.

The computing device 800 may include a variety of tangible processor-readable storage media and intangible processor-readable communication signals. Tangible processor-readable storage can be embodied by any available media that can be accessed by the computing device 800 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes but is not limited to RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 800. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A system for detecting proximity of a conductive object to an antenna element, the system comprising: a thin film resistive element in a cover layer and cover glass, the thin film resistive element including a material having greater conductivity than the cover glass and configured to detectably capacitively couple with the conductive object when the conductive object is within proximity of the thin film resistive element; an antenna element in an antenna layer, the antenna element being configured to transmit a signal; and an electrically insulating material in a dielectric gap layer, the dielectric gap layer being positioned between the cover layer and the antenna layer and electrically insulating the antenna element from the thin film resistive element.

Clause 2. The system of clause 1, the thin film resistive element comprising: an electrode element electrically coupled to the thin film resistive element and exposed on a surface of the cover layer.

Clause 3. The system of clause 1, further comprising: proximity detection circuitry in electronic communication with the thin film resistive element and configured to detect the proximity of the conductive object to the antenna element by supplying an alternating current to the thin film resistive element and detecting capacitive coupling between the thin film resistive element and the conductive object.

Clause 4. The system of clause 3, further comprising: a specific absorption rate controller configured to control, based on the detection of the proximity, transmission power supplied to the antenna element to transmit the signal.

Clause 5. The system of clause 4, wherein the specific absorption rate controller is configured to determine a dielectric loss of the conductive object based on the detection of capacitive coupling and determine to modify the transmission power supplied to the antenna element to transmit the signal based on the determination of the dielectric loss.

Clause 6. The system of clause 4, wherein the specific absorption rate controller is configured to determine a dielectric loss of the conductive object based on the detection of capacitive coupling, determine the conductive object is an anatomical feature of a person based on the determination of the dielectric loss, and determine to reduce the transmission power supplied to the antenna element to transmit the signal based on the determination that the conductive object is the anatomical feature of the person.

Clause 7. The system of clause 3, wherein the proximity detection circuitry is an element of a touch controller of a capacitive touch display configured to detect touch signals from a touch sensor other than the thin film resistive element.

Clause 8. The system of clause 7, wherein the touch sensor is at a position other than the cover layer.

Clause 9. The system of clause 1, wherein the thin film resistive element overlaps the antenna element within an axis extending substantially orthogonally through a surface of each of the cover layer, the dielectric gap layer, and the antenna layer.

Clause 10. The system of clause 1, wherein the thin film resistive element does not overlap the antenna element in an axis extending substantially orthogonally through a surface of each of the cover layer, the dielectric gap layer, and the antenna layer.

Clause 11. The system of clause 1, wherein the thin film resistive element is continuous across the antenna element.

Clause 12. The system of clause 1, wherein the thin film resistive element includes at least one aperture overlapping the antenna element.

Clause 13. The system of clause 1, wherein the dielectric gap layer includes an adhesive that couples the antenna layer to the cover layer.

Clause 14. The system of clause 1, wherein the dielectric gap layer comprises: a spacer adapted to provide a layer of air between the cover layer and the antenna layer.

Clause 15. The system of clause 1, wherein the thin film resistive element is positioned on an interior surface of the cover layer facing the antenna layer.

Clause 16. The system of clause 1, wherein the thin film resistive element is embedded within the cover layer.

Clause 17. A method of manufacturing a system for detecting proximity of a conductive object to an antenna element, comprising: forming a thin film resistive element in a cover layer including cover glass, the thin film resistive element including a material having greater conductivity than the cover glass and configured to detectably capacitively couple with the conductive object when the conductive object is within proximity of the thin film resistive element; and positioning an electrically insulating material in a dielectric gap layer between the cover layer and an antenna layer including an antenna element configured to transmit a signal, wherein the dielectric gap layer electrically insulates the antenna element from the thin film resistive element.

Clause 18. The method of clause 17, further comprising: coupling electrically the thin film resistive element with proximity detection circuitry configured to detect the proximity of the conductive object to the antenna element by passing an alternating current through the thin film resistive element and detecting capacitive coupling between the thin film resistive element and the conductive object.

Clause 19. A method of detecting proximity of a conductive object to an antenna element, comprising: supplying current to a thin film resistive element in a cover layer including cover glass, the thin film resistive element including a material having greater conductivity than the cover glass and configured to detectably capacitively couple with the conductive object when the conductive object is within proximity of the thin film resistive element; detecting capacitive coupling between the conductive object and the thin film resistive element; and insulating electrically, by a dielectric gap layer including an insulating material, the antenna element in an antenna layer from the thin film resistive element, the dielectric gap layer being positioned between the cover layer and the antenna layer.

Clause 20. The method of clause 19, further comprising: modifying transmission power supplied to the antenna element to transmit a signal, based on the detection of the capacitive coupling.

An example system for manufacturing a system for detecting proximity of a conductive object to an antenna element is provided, including means for forming a thin film resistive element in a cover layer including cover glass, the thin film resistive element including a material having greater conductivity than the cover glass and configured to detectably capacitively couple with the conductive object when the conductive object is within proximity of the thin film resistive element; and means for positioning an electrically insulating material in a dielectric gap layer between the cover layer and an antenna layer including an antenna element configured to transmit a signal, wherein the dielectric gap layer electrically insulates the antenna element from the thin film resistive element.

Another example system of any disclosed system is provided, further including means for coupling electrically the thin film resistive element with proximity detection circuitry configured to detect the proximity of the conductive object to the antenna element by passing an alternating current through the thin film resistive element and detecting capacitive coupling between the thin film resistive element and the conductive object.

An example system for detecting proximity of a conductive object to an antenna element is provided, including means for supplying current to a thin film resistive element in a cover layer including cover glass, the thin film resistive element including a material having greater conductivity than the cover glass and configured to detectably capacitively couple with the conductive object when the conductive object is within proximity of the thin film resistive element; means for detecting capacitive coupling between the conductive object and the thin film resistive element; and means for insulating electrically, by a dielectric gap layer including an insulating material, the antenna element in an antenna layer from the thin film resistive element, the dielectric gap layer being positioned between the cover layer and the antenna layer.

Another example system of any disclosed system is provided, further including means for modifying transmission power supplied to the antenna element to transmit a signal, based on the detection of the capacitive coupling.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein may be implemented as logical steps in one or more computer systems. The logical operations may be implemented (1) as a sequence of processor-implemented steps executing in one or more computer systems or (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

While this specification contains many specific implementation details, these should not be construed as limitations on the scope of any technologies or of what may be claimed but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination. Other implementations are within the scope of the following claims. Nevertheless, it will be understood that various modifications can be made without departing from the spirit and scope of the recited claims.

As used herein, terms such as "substantially," "about," "approximately," or other terms of relative degree are interpreted as a person skilled in the art would interpret the terms and/or amount to a magnitude of variability of one or more of 1%, 2%, 3%, 4%, 5%, 6%, 7%, 8%, 9%, 10%, 11%, 12%, 13%, 14%, or 15% of a metric a person ordinarily skilled in the art would quantitively apply to the quantitative or qualitative feature described. For example, a term of relative degree applied to orthogonality suggests an angle may have a magnitude of variability relative to a right angle.

What is claimed is:

1. A system for detecting proximity of a conductive object to an antenna element, the system comprising:
    a thin film resistive element in a cover layer and cover glass, the thin film resistive element including a material having greater conductivity than the cover glass and configured to detectably capacitively couple with the conductive object when the conductive object is within proximity of the thin film resistive element;
    an antenna element in an antenna layer, the antenna element being configured to transmit a signal; and
    an electrically insulating material in a dielectric gap layer, the dielectric gap layer being positioned between the cover layer and the antenna layer and electrically insulating the antenna element from the thin film resistive element.

2. The system of claim 1, the thin film resistive element comprising:
    an electrode element electrically coupled to the thin film resistive element and exposed on a surface of the cover layer.

3. The system of claim 1, further comprising:
    proximity detection circuitry in electronic communication with the thin film resistive element and configured to detect the proximity of the conductive object to the antenna element by supplying an alternating current to the thin film resistive element and detecting capacitive coupling between the thin film resistive element and the conductive object.

4. The system of claim 3, further comprising:
a specific absorption rate controller configured to control, based on the detection of the proximity, transmission power supplied to the antenna element to transmit the signal.

5. The system of claim 4, wherein the specific absorption rate controller is configured to determine a dielectric loss of the conductive object based on the detection of capacitive coupling and determine to modify the transmission power supplied to the antenna element to transmit the signal based on the determination of the dielectric loss.

6. The system of claim 4, wherein the specific absorption rate controller is configured to determine a dielectric loss of the conductive object based on the detection of capacitive coupling, determine the conductive object is an anatomical feature of a person based on the determination of the dielectric loss, and determine to reduce the transmission power supplied to the antenna element to transmit the signal based on the determination that the conductive object is the anatomical feature of the person.

7. The system of claim 3, wherein the proximity detection circuitry is an element of a touch controller of a capacitive touch display configured to detect touch signals from a touch sensor other than the thin film resistive element.

8. The system of claim 7, wherein the touch sensor is at a position other than the cover layer.

9. The system of claim 1, wherein the thin film resistive element overlaps the antenna element within an axis extending substantially orthogonally through a surface of each of the cover layer, the dielectric gap layer, and the antenna layer.

10. The system of claim 1, wherein the thin film resistive element does not overlap the antenna element in an axis extending substantially orthogonally through a surface of each of the cover layer, the dielectric gap layer, and the antenna layer.

11. The system of claim 1, wherein the thin film resistive element is continuous across the antenna element.

12. The system of claim 1, wherein the thin film resistive element includes at least one aperture overlapping the antenna element.

13. The system of claim 1, wherein the dielectric gap layer includes an adhesive that couples the antenna layer to the cover layer.

14. The system of claim 1, wherein the dielectric gap layer comprises:
a spacer adapted to provide a layer of air between the cover layer and the antenna layer.

15. The system of claim 1, wherein the thin film resistive element is positioned on an interior surface of the cover layer facing the antenna layer.

16. The system of claim 1, wherein the thin film resistive element is embedded within the cover layer.

17. A method of manufacturing a system for detecting proximity of a conductive object to an antenna element, comprising:
forming a thin film resistive element in a cover layer including cover glass, the thin film resistive element including a material having greater conductivity than the cover glass and configured to detectably capacitively couple with the conductive object when the conductive object is within proximity of the thin film resistive element; and
positioning an electrically insulating material in a dielectric gap layer between the cover layer and an antenna layer including an antenna element configured to transmit a signal, wherein the dielectric gap layer electrically insulates the antenna element from the thin film resistive element.

18. The method of claim 17, further comprising:
coupling electrically the thin film resistive element with proximity detection circuitry configured to detect the proximity of the conductive object to the antenna element by passing an alternating current through the thin film resistive element and detecting capacitive coupling between the thin film resistive element and the conductive object.

19. A method of detecting proximity of a conductive object to an antenna element, comprising:
supplying current to a thin film resistive element in a cover layer including cover glass, the thin film resistive element including a material having greater conductivity than the cover glass and configured to detectably capacitively couple with the conductive object when the conductive object is within proximity of the thin film resistive element;
detecting capacitive coupling between the conductive object and the thin film resistive element; and
insulating electrically, by a dielectric gap layer including an insulating material, the antenna element in an antenna layer from the thin film resistive element, the dielectric gap layer being positioned between the cover layer and the antenna layer.

20. The method of claim 19, further comprising:
modifying transmission power supplied to the antenna element to transmit a signal, based on the detection of the capacitive coupling.

* * * * *